US009486889B2

(12) United States Patent
Sakurada

(10) Patent No.: US 9,486,889 B2
(45) Date of Patent: Nov. 8, 2016

(54) TOLERANCE DETECTION METHOD AND TOLERANCE DETECTION DEVICE FOR SHAPE MEASURING APPARATUS

(75) Inventor: Junji Sakurada, Kitahiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 351 days.

(21) Appl. No.: 13/029,331

(22) Filed: Feb. 17, 2011

(65) Prior Publication Data

US 2011/0218763 A1    Sep. 8, 2011

(30) Foreign Application Priority Data

Mar. 5, 2010 (JP) .................................. 2010-049558

(51) Int. Cl.
  *G01B 3/22* (2006.01)
  *G06F 11/30* (2006.01)
  *B23Q 17/20* (2006.01)
  *G01B 5/20* (2006.01)
  *G05B 19/401* (2006.01)

(52) U.S. Cl.
  CPC ............... *B23Q 17/20* (2013.01); *G01B 5/201* (2013.01); *G05B 19/401* (2013.01)

(58) Field of Classification Search
  CPC ..... G01B 5/201; G05B 19/401; B23Q 17/20
  USPC ................................................. 702/167, 182
  See application file for complete search history.

(56) References Cited

U.S. PATENT DOCUMENTS

| 3,665,419 | A | * | 5/1972 | Hartmann et al. | ............ 345/418 |
| 5,481,465 | A | * | 1/1996 | Itoh et al. | ..................... 700/118 |
| 5,694,339 | A | * | 12/1997 | Ishitoya | ............... G05B 19/401 33/503 |
| 6,260,000 | B1 | * | 7/2001 | Karasaki et al. | ............. 702/155 |
| 2004/0054502 | A1 | * | 3/2004 | Sakurada | ....................... 702/182 |
| 2004/0107073 | A1 | * | 6/2004 | Sakurada et al. | ............. 702/167 |
| 2007/0003163 | A1 | | 1/2007 | Lee et al. | |
| 2008/0246974 | A1 | * | 10/2008 | Wilson et al. | ................ 356/634 |
| 2009/0021747 | A1 | * | 1/2009 | Kawasaki et al. | ............ 356/501 |
| 2009/0082986 | A1 | * | 3/2009 | Pettersson | ....................... 702/95 |
| 2009/0306931 | A1 | | 12/2009 | Negishi | |
| 2010/0050837 | A1 | | 3/2010 | Ould et al. | |
| 2011/0184695 | A1 | * | 7/2011 | Grzesiak | ....................... 702/167 |

FOREIGN PATENT DOCUMENTS

| JP | 6-11336 | 1/1994 |
| JP | 8-313247 | 11/1996 |

OTHER PUBLICATIONS

Gao W et al., "On-machine roundness measurement of cylindrical workpieces by the combined three-point method", Measurement, Institute of Measurement and Control. London, GB, vol. 21, No. 4, XP004117468 , Aug. 1, 1997, pp. 147-156.

* cited by examiner

*Primary Examiner* — Gregory J Toatley
*Assistant Examiner* — Eman Alkafawi
(74) *Attorney, Agent, or Firm* — Greenblum & Bernstein, P.L.C.

(57) ABSTRACT

When detecting a tolerance of a shape of a measured object having a complicated shape that makes it difficult to perform a continued measurement, a plurality of partial measurement data that are set are retrieved. Next, a reference position is set from first partial measurement data. Then, each of the partial measurement data is combined into one data using the reference position. Further, the tolerance is calculated using the combined data.

16 Claims, 10 Drawing Sheets

TOLERANCE DETECTION METHOD AND TOLERANCE DETECTION DEVICE FOR SHAPE MEASURING APPARATUS

CROSS-REFERENCE TO RELATED APPLICATIONS

The present application claims priority under 35 U.S.C. §119 of Japanese Application No. 2010-049558, filed on Mar. 5, 2010, the disclosure of which is expressly incorporated by reference herein in its entirety.

BACKGROUND OF THE INVENTION

1. Field of the Invention

A non-limiting aspect of the present disclosure relates to a tolerance detection method and a tolerance detection device for a shape measuring apparatus. More specifically, the present disclosure relates to a tolerance detection method and a tolerance detection device for a shape measuring apparatus that is suitable to be used for a circularity measuring apparatus and is capable of effortlessly detecting, with one calculation operation, a tolerance of a shape of a measured object having a complicated shape that makes it difficult to perform a continued measurement, and had been calculated only by divisional measurements.

2. Description of Related Art

In order to measure an object having a rotating columnar or cylindrical shape, a shape measuring apparatus, such as a circularity measuring apparatus, is known that collects from such a measured object, various data related to circularity including circularity, concentricity, and coaxiality. When using such a circularity measuring apparatus, a measured object is placed on a turn table. The surface shape of the measured object is detected by a detecting head and the like while the turn table is rotated. Accordingly, the surface shape data of the measured object is accumulated and a value such as circularity is measured and calculated (Related Art 1).

In particular, a stylus having a spherical gauge head at its extremity is biased in a radius direction of the turn table (referred to as R axis direction) and is contacted on a surface of the measured object. A displacement amount of the stylus is detected by a linear encoder while the rotation angle of the turn table is detected by the rotary encoder. By pairing both of the detected values as detection data, the detection data is collected while the measured object is rotated with one revolution, which makes it possible to measure the shape of the entire periphery. Further, the collected detection data is used to perform a minimum square method, minimum domain method, or the like in order to obtain further strict average circular data, which will be used to calculate a circularity value and the like.

As shown in FIG. 1, however, when measuring an object such as a measured object 24, whose shape makes it difficult to perform a continued measurement, due to its protrusions 24a or cut-out portions for key holes or serrations, a circularity measurement apparatus that does not have a profiling measurement function would need to divide the measurement into four partial circumferences as shown in measurements (1)-(4) of FIG. 1, in order to minimize physical damages on the detector. Therefore, a geometrical tolerance can only be obtained to each of the partially divided circumferences. In other words, while the detector that detects displacement is provided with the stylus at its extremity, the stylus only moves in the R axis direction. Therefore, only the displacement in the R axis direction is detected. Accordingly, when there is a projection, the stylus may not be able to move over the projection and break the detector. In addition, when there is a groove, the stylus may become trapped therein and may not be able to emerge therefrom, which may also cause the breakage of the detector.

Accordingly, in order to obtain the geometric tolerance of the entire shape, one must first obtain individual geometric tolerance values of each of the partially divided circumferences, and estimate the geometric tolerance of the entire shape using the maximum and minimum values of the individual partial data.

Related Art 2 describes another method of calculating circularity of a cross section shape having cut-out portions, by removing concave bottom portion data and convex apex portion data that are not subject to the measurement, and calculating the circularity based on the remaining measurement data.

[Related Art 1] Japanese Patent No. 2701141
[Related Art 2] Japanese Patent Laid-Open Application No. H06-11336

However, the above-described method is for a measured object that allows continued measurement of its entire shape. The method cannot be applied to a measured object having a complicated shape that makes it difficult to perform a continued measurement, thereby requiring divisional measurements.

SUMMARY OF THE INVENTION

The present invention addresses the above-described circumstances. The present invention provides a method of effortlessly detecting, with one calculation operation, a tolerance of a shape of a measured object having a complicated shape that makes it difficult to perform a continued measurement, and had been calculated only by divisional measurements.

According to the present invention, when detecting a tolerance of a shape of a measured object having a complicated shape that makes it difficult to perform a continued measurement, a plurality of partial measurement data that are set are retrieved. Next, a reference position is set from first partial measurement data. Then, each of the partial measurement data is combined into one data using the reference position. Further, the tolerance is calculated using the combined data.

In addition, a tolerance detection method for a shape measuring apparatus includes combining one partial measurement data with another partial measurement data to coincide at a combining section.

In addition, a tolerance detection method for a shape measuring apparatus includes continuously combining one partial measurement data with another partial measurement data at a combining section.

Further, a tolerance detection method for a shape measuring apparatus includes combining each of partial measurement data so that average values of the data coincide with one another.

The present invention provides a tolerance detection device for a shape measuring apparatus, when detecting a tolerance of a shape of a measured object having a complicated shape that makes it difficult to perform a continued measurement. The device includes a retriever that retrieves a plurality of partial measurement data that are set; a setter that sets a reference position from first partial measurement data; a combiner that combines each of the partial measurement data into one data using the reference position; and a calculator that calculates a tolerance using the combined data.

According to the present invention, it is possible to effortlessly detect, with one calculation operation, a tolerance of a shape of a measured object having a complicated shape that makes it difficult to perform a continued measurement, and had been calculated only by divisional measurements.

Accordingly, it is possible to save the trouble of obtaining a plurality of numerical values to estimate a tolerance of an entire shape, thereby saving time to confirm the result. Further, it is possible to determine a geometric tolerance of a combined shape through a line measurement, which increase the number of variations available for automatic measurement.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

An embodiment of the present invention is illustrated in detail with reference to the drawings.

Figure 1:
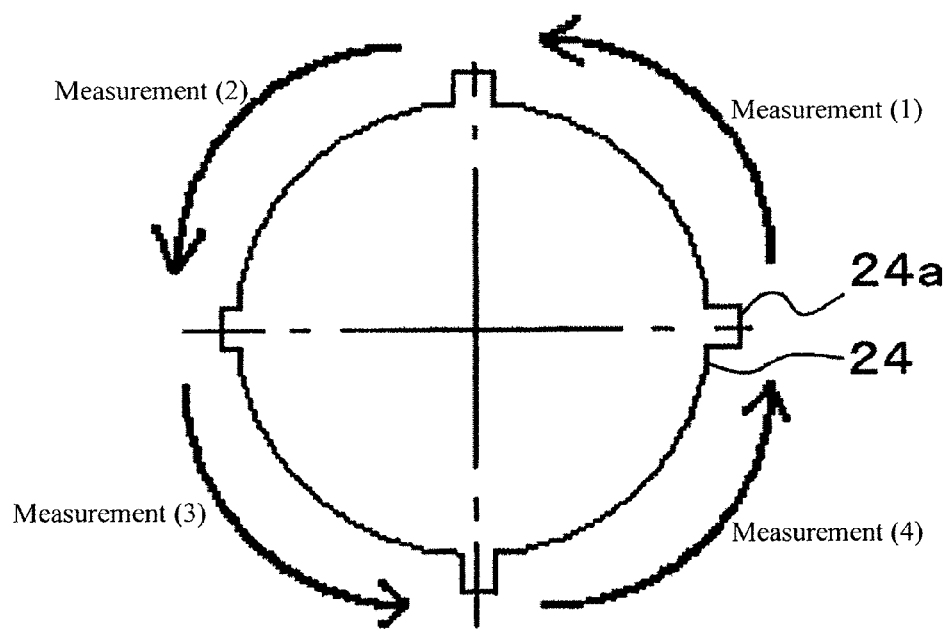
FIG. 1 is a schematic view of measured data of a cylinder having a complicated shape making it difficult to perform a continued measurement.
Figure 2:
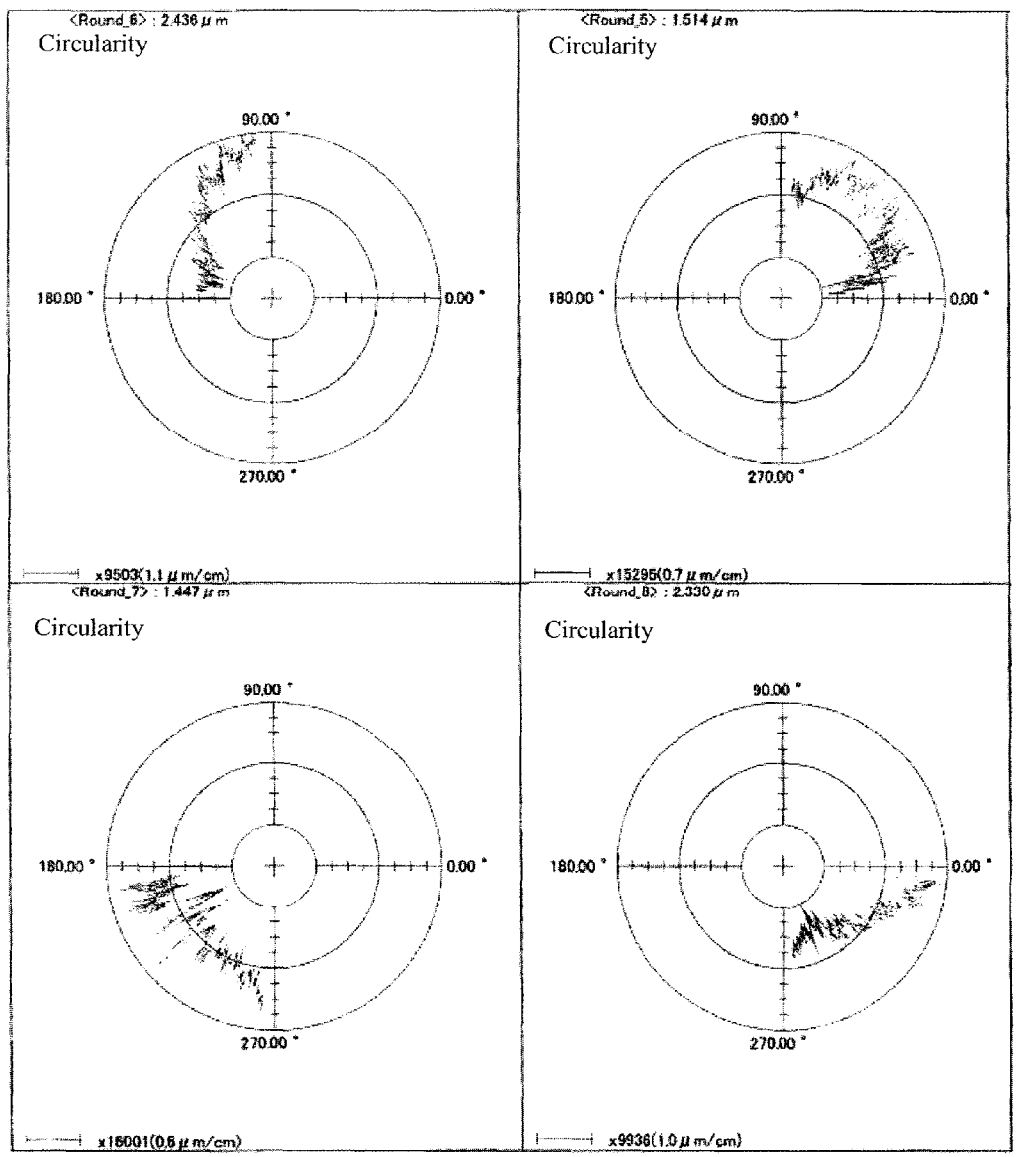
FIG. 2 illustrates a specific example of the measured data shown in FIG. 1.
Figure 3:
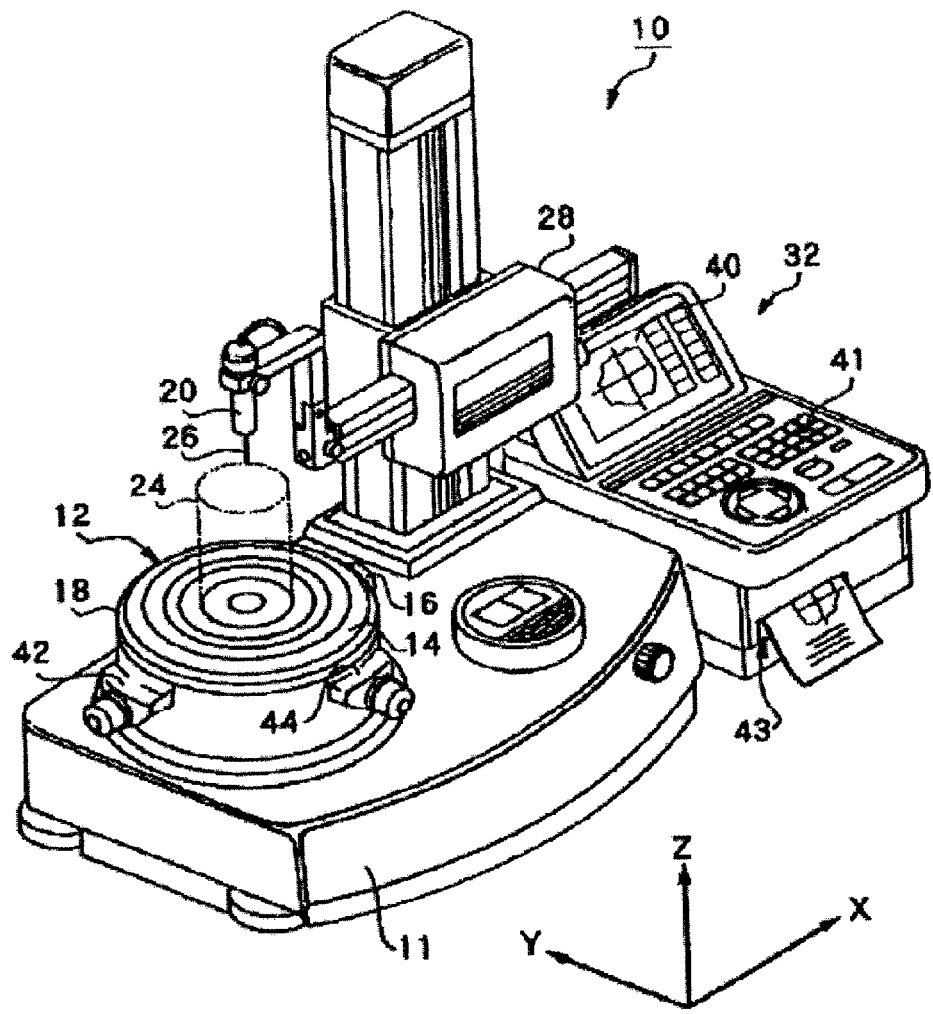
FIG. 3 is an oblique and schematic view of a circularity measuring apparatus according to an embodiment of the present invention.
Figure 4:
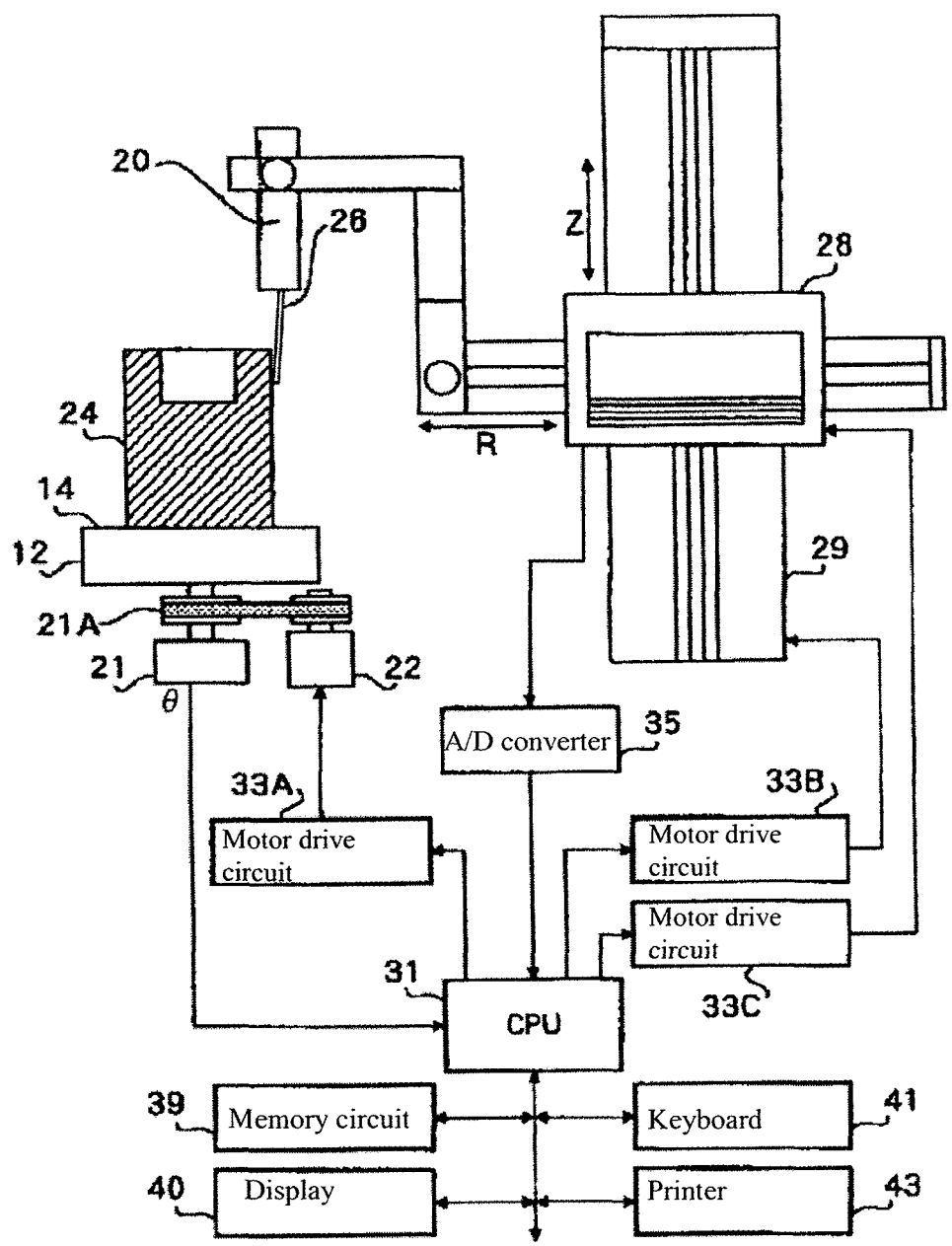
FIG. 4 is a block diagram illustrating a configuration of the circularity measuring apparatus according to the embodiment of the present invention.

FIG. 3 is a schematic view of a circularity measuring apparatus according to the embodiment of the present invention. FIG. 4 is a block diagram illustrating a configuration of the circularity measuring apparatus. In the present embodiment, a measured object 24 is placed on a turn table 12 provided on a base 11. A drive command from a CPU is input in a motor drive circuit 33A so that a motor 22 is rotated. The driving force is transmitted to a rotating shaft of the turn table 12 via a belt 21A and a pulley, and the turn table 12 is turned at a constant speed. The rotating angle θ is sequentially detected by a rotary encoder 21 and input to the CPU 31 as a digital signal. A displacement detection signal from a detection head 20 in a radius direction (R axis direction) of the turn table 12 (measured object 24) is converted to a digital signal by an A/D converter 35 and sequentially input to the CPU 31. A stylus 26 is attached to the detection head 20. The stylus 26 is continuously displaced and biased by a spring or the like, to a predetermined constant direction with respect to the detection head 20. When measuring the object, a tip of the stylus contacts the measured object 24. The stylus 26 is displaced over the biasing force of the spring, and the displacement amount of the stylus 26 is detected by a displacement detector configured with a differential transformer or the like within the detection head 20. Normally, although the resolving power of the displacement detector is high, the measurable range is quite small, which is ±300 μm. Therefore, in order to adjust the location of the detection head 20, the CPU 31 automatically controls each axial direction drive of Z axis (vertical direction) and R axis (radius direction). Specifically, a drive command of the Z axis direction is input to the motor drive circuit 33B by the CPU 31 and a Z axis direction driver 29 moves the detection head 20 in the Z axis direction. Similarly, a drive command of the R axis direction is input to the motor drive circuit 33C by the CPU 31 and an R axis direction driver 28 moves the detection head 20 in the R axis direction. A linear encoder that detects the location in the R axis direction is provided in the R axis direction driver 28.

The displacement detection signal from the linear encoder is first input to the A/D converter 35 for conversion into a digital signal. Then, the signal is input to the CPU 31. Since the detection signal of the rotation angle θ from the rotary encoder 21 is already a digital signal, it is directly input to the CPU 31. These digital signals are paired and treated as measurement data and stored in the memory circuit 39. As needed, the data is retrieved from the CPU 31 for circularity calculation, coaxiality calculation and the like, through a minimum square method, a minimum domain method and the like. The result of such calculation is displayed on a display 40 or print-recorded by a printer 43. An operator can instruct from a keyboard 41 through which path the display head 20 is moved, what kind of geometrical calculation is performed on the measured data, and the like. As needed, it is possible to output the measured data or the result of the geometrical calculation through communication with outside.

Figure 5:
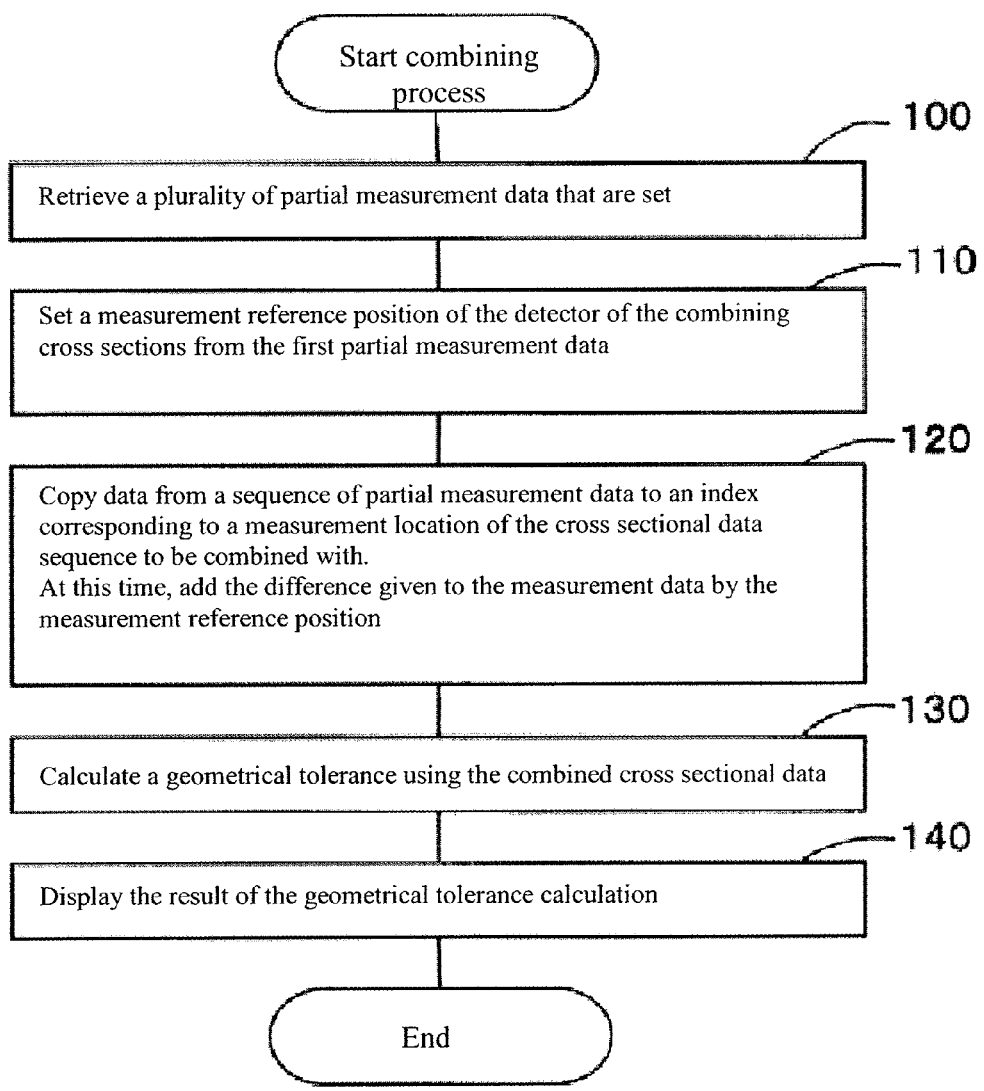
FIG. 5 is a flowchart illustrating a combining process according to the embodiment of the present invention.

FIG. 5 illustrates in detail a combining process according to the embodiment of the present invention.

At step 100, a plurality of partial measurement data that are set is retrieved.

At step 110, for combining cross sectional data, a measurement reference position of the detector is set from the first partial measurement data.

Figure 6:
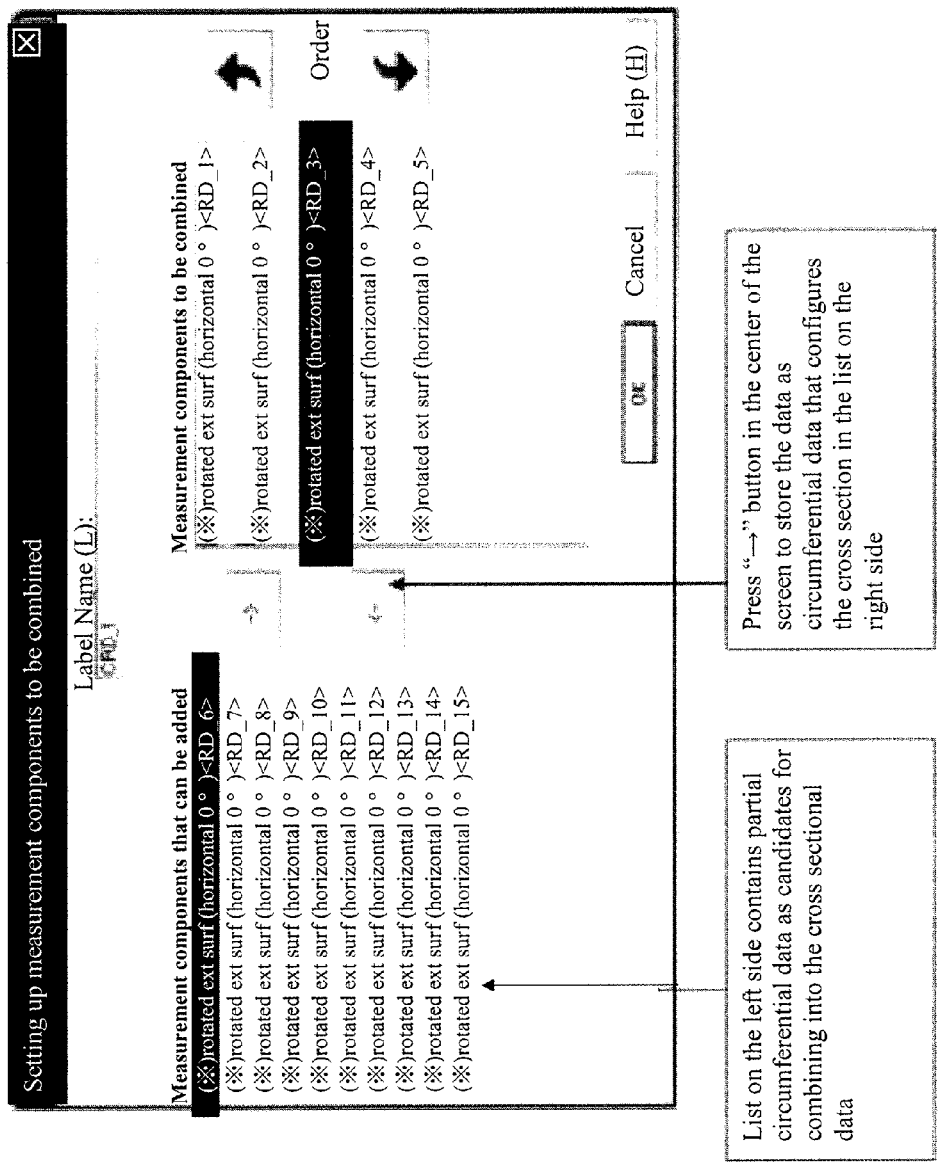
FIG. 6 illustrates an example of a setup screen in order to combine circumferential data of a plurality of partial cross sections into a single cross section according to the embodiment of the present invention.

At step 120, as shown in FIG. 6, the operator views a set up screen displayed on the display 40 and copies data from a sequence of partial measurement data to an index corresponding to a measurement location of the cross sectional data sequence to be combined with. Specifically, the list on the left side of FIG. 6 contains partial circumferential data as candidates for combining into the cross sectional data. For example, by pressing a "→" button in the center of the screen, it is possible to store the data as circumferential data that configures the cross section in the list on the right side.

Figure 7:
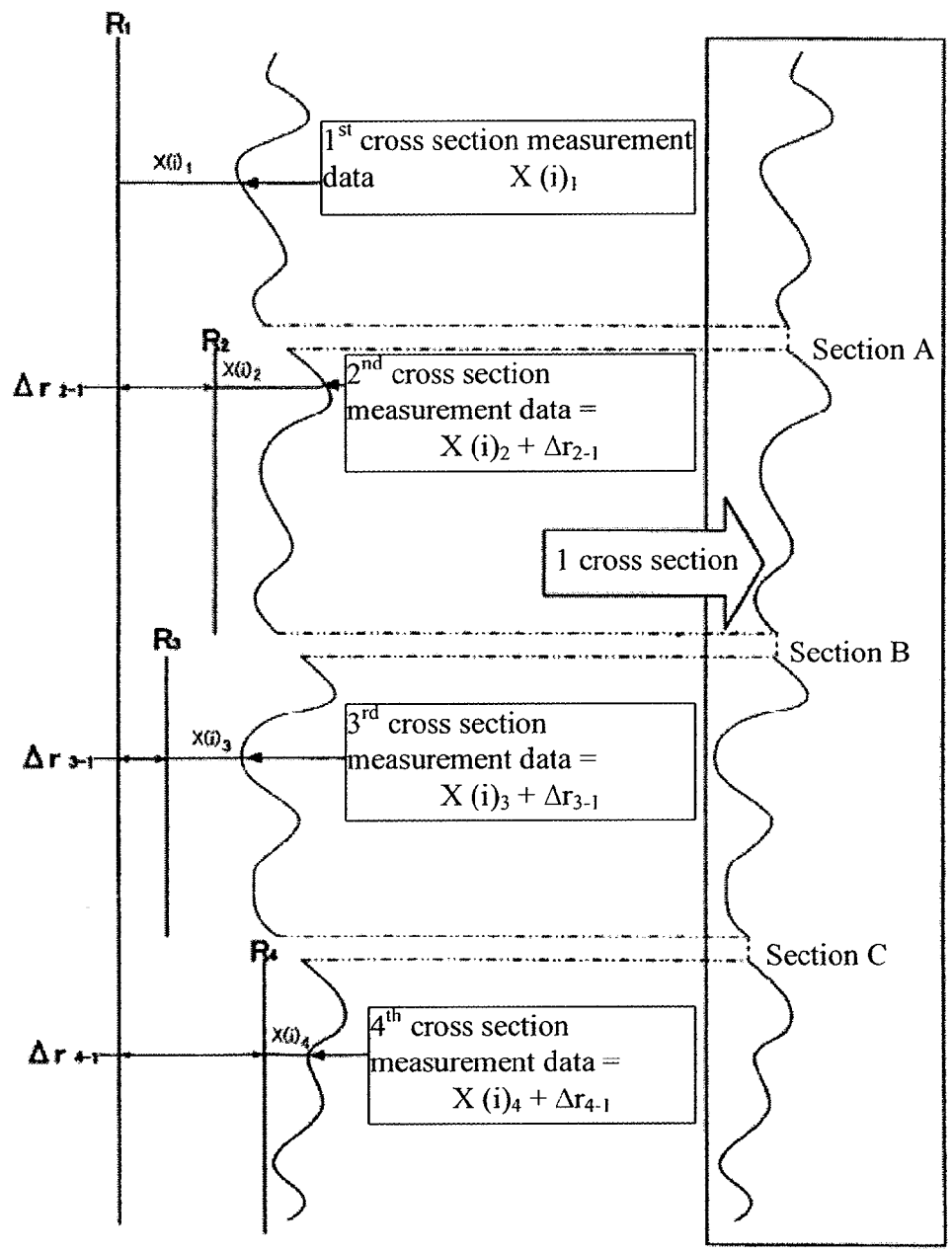
FIG. 7 illustrates a process of converting a plurality of displacement amounts of partial cross sections into a displacement amount of a single cross section.

At this time, the difference given to the measurement data by the measurement reference position is added. Particularly, as shown in FIG. 7, discrepancy of each cross sectional data is corrected and one cross section is configured as shown on the right side of FIG. 7. In FIG. 7, Rn is the $n^{th}$ measured radius value of the cross section. $\Delta r_{n-1}$ is a difference between the $i^{th}$ measured radius value of the cross section and the first measured radius value of the cross section.

For example, when the first measurement data of the cross section is $x(i)_1$, the second measurement data of the cross section is $x(i)_2 + \Delta r_{2-1}$, the third measurement data of the cross section is $x(i)_3 + \Delta r_{3-1}$, and the fourth measurement data of the cross section is $x(i)_4 + \Delta r_{4-1}$. It is possible to determine that, as for $\Delta r_{2-1}$, the initial data of the second cross section coincides with the last data of the first; as for $\Delta r_{3-1}$, the initial data of the third cross section coincides with the last data of the second; as for $\Delta r_{4-1}$, the initial data of the fourth cross section coincides with the last data of the third. Each of the intervals A, B, and C of each group can be connected with a straight line.

When step 120 of FIG. 5 is finished, step 130 is performed where a geometrical tolerance is calculated using the combined cross sectional data as shown in the right side of FIG. 7.

In the following step 140, the result of the geometrical tolerance calculation is displayed as a numerical value or a drawing on the display 40, for example. Then, the process is completed.

Figure 8:
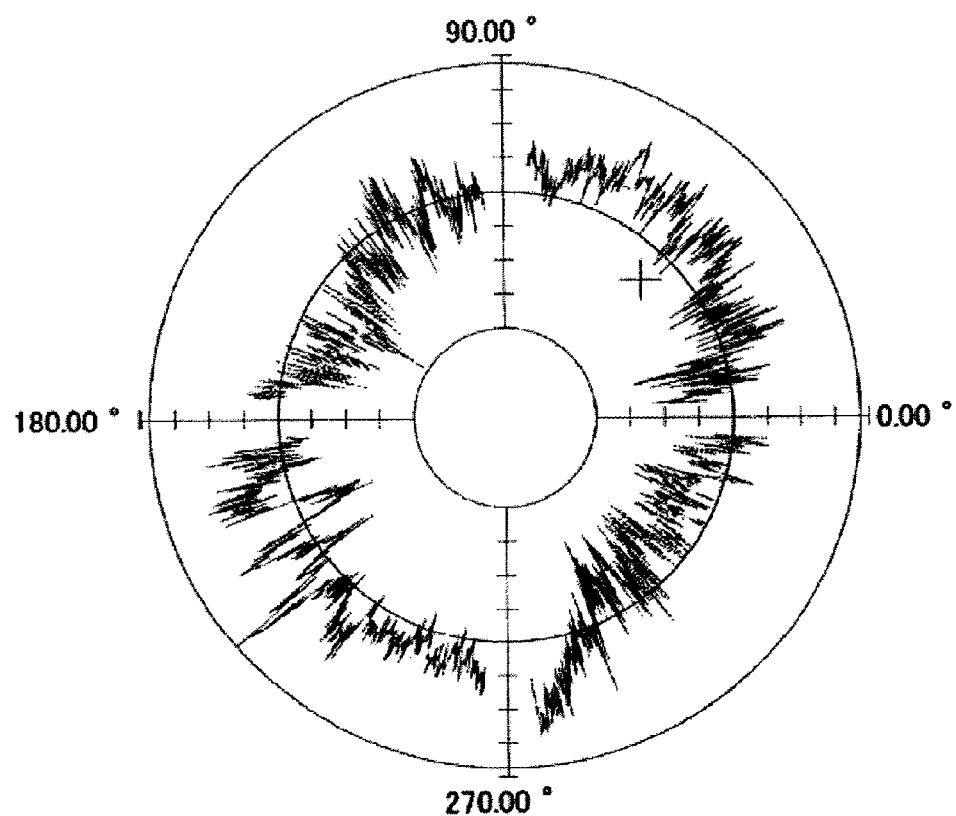
FIG. 8 illustrates an example of combined circumferential data.

FIG. 8 illustrates an example of the combined cross sectional data.

Accordingly, by recognizing the divided circumferential data as one cross section data, it is possible to obtain a geometrical tolerance of a cross section of a cylindrical object at one time.

Figure 9:
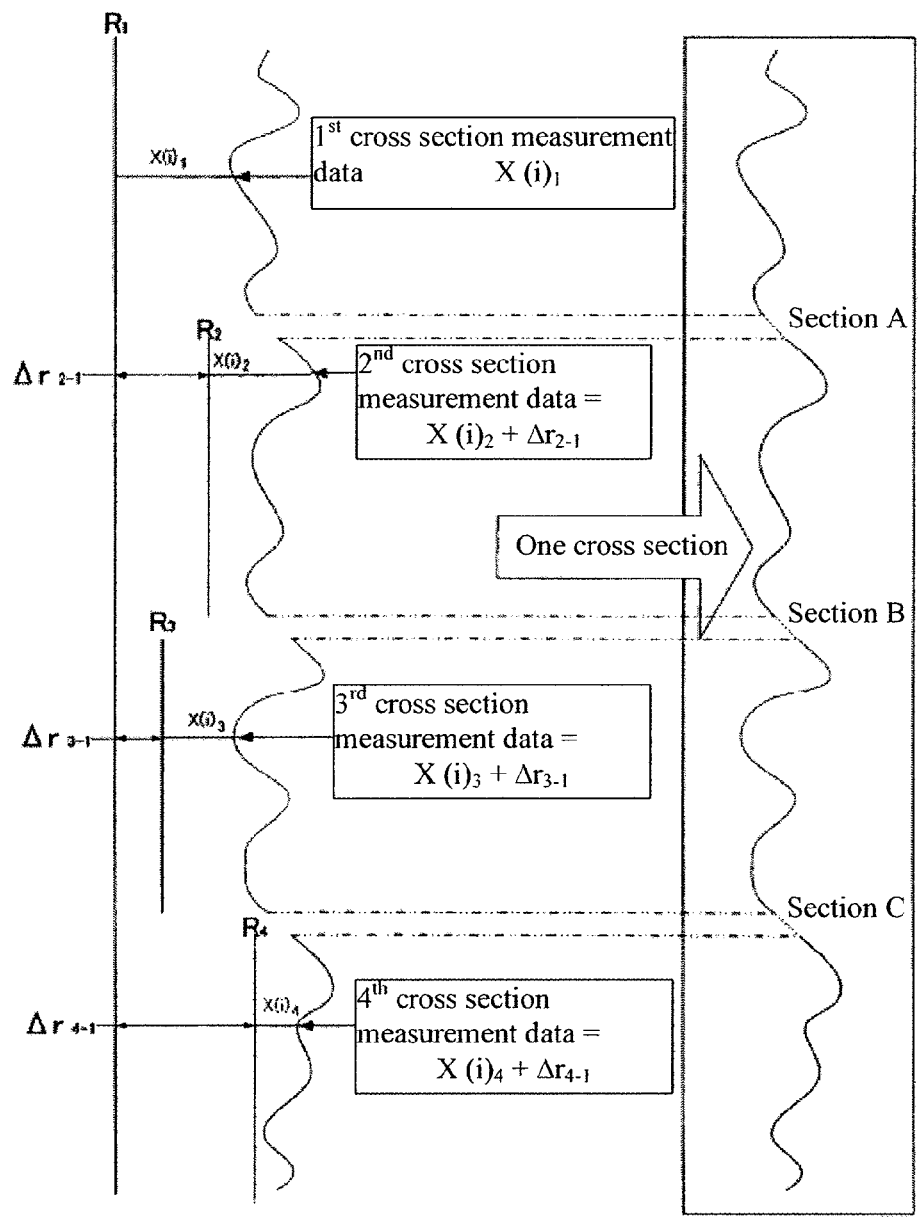
FIG. 9 illustrates a modification of the combining process.
Figure 10:
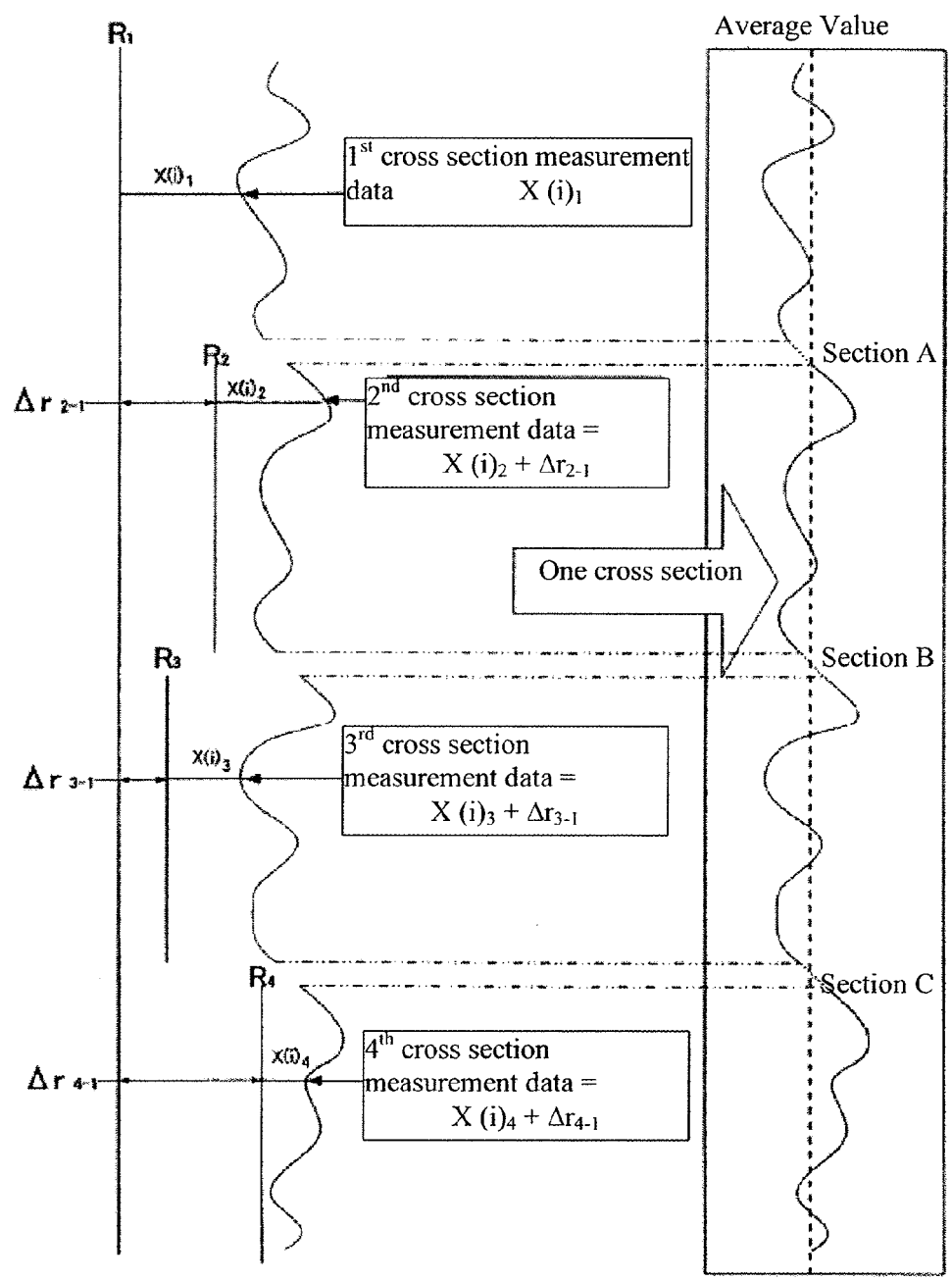
FIG. 10 illustrates another modification of the combining process.

Further, the data combining method is not limited to the above-described embodiment. As shown in an example of FIG. 9, an extended line from one end of data may be connected with an end of another data. Further, in view of a likelihood of a substantial accidental error of the first and last data of each group, a measure may be taken as illustrated in FIG. 10, where an average value of data from each group is matched so that the combination reflects an average error level.

The measured object is not limited to a circumference or cylindrical shape. In addition, the shape measurement apparatus is not limited to the circularity measurement apparatus.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A shape detection method to detect a circularity of an object with a circularity measuring apparatus having a stylus that is continuously displaced and spring biased in a predetermined constant direction, the method comprising:

retrieving a plurality of sequential sets of partial measurement data defining corresponding parts of a surface of a circular measured object having circularity, each set of partial measurement data being determined with respect to one or two corresponding reference positions;

setting a reference position as one of the corresponding reference positions of a first set of the partial measurement data of the plurality of partial measurement data;

copying data from a sequence of the partial measurement data to an index corresponding to a measurement location of a cross sectional data sequence for combining into one cross sectional data;

combining each of the sets of the plurality of partial measurement data into one data set using the set reference position and taking account of differences between the set reference position of the first set of partial measurement data and reference positions of other sets of partial measurement data so that the one data set is defined with respect to the set reference position; and calculating a geometric tolerance of the shape of the surface of the measured object using the one cross sectional data, configured by circumferential data based on the combined data set, to obtain the geometric tolerance of a cross section of the measured object at one time.

2. A shape detection device to detect a circularity of an object with a circularity measuring apparatus having a stylus that is continuously displaced and spring biased in a predetermined constant direction, the device comprising:

a retriever that retrieves a plurality of sequential sets of partial measurement data defining corresponding parts of a surface of a circular measured object having circularity, each set of partial measurement data being determined with respect to one or two corresponding reference positions;

a setter that sets a reference position as one of the corresponding reference positions of a first set of the partial measurement data of the plurality of partial measurement data;

a copier that copies data from the sequential sets of the partial measurement data to an index corresponding to a measurement location of a cross sectional data sequence for combining into one cross sectional data;

a combiner that combines each of the sets of the plurality of partial measurement data into one data set using the set reference position and taking account of the differences between the set reference position of the first set of partial measurement data and reference positions of the other sets of partial measurement data so that the one data set is defined with respect to the set reference position; and a calculator that calculates a geometric tolerance of the shape of the surface of the measured object using the one cross sectional data, configured by circumferential data based on the combined data set, to obtain the geometric tolerance of a cross section of the measured object at one time.

3. The method according to claim 1, wherein the combining comprises combining one partial measurement data set with another partial measurement data set such that the initial data of one set of the partial measurement data coincides with the last data of the next partial measurement data set.

4. The method according to claim 1, wherein the combining comprises continuously spatially combining one partial measurement data set with another partial measurement data set at a combining section.

5. The method according to claim 1, wherein the combining comprises combining each of the partial measurement data sets so that average values of the data coincide with one another.

6. The method according to claim 1, wherein the one cross sectional data comprises circumferential data of a plurality of partial cross sections.

7. The method according to claim 1, wherein a plurality of displacement amounts of partial cross sections are converted into a displacement amount of a single cross section.

8. The shape detection device according to claim 2, wherein one cross sectional data comprises circumferential data of a plurality of partial cross sections.

9. The shape detection device according to claim 2, wherein a plurality of displacement amounts of partial cross sections are converted into a displacement amount of a single cross section.

10. A circularity measuring system to detect a circularity of an object, comprising:
  a stylus that is continuously displaced and spring biased in a predetermined constant direction;
  a memory that stores executable instructions that, when executed by the processor, cause the processor to:
    retrieve a plurality of sequential sets of partial measurement data defining corresponding parts of a surface of a circular measured object having circularity, each set of partial measurement data being determined with respect to one or two corresponding reference positions;
    set a reference position as one of the corresponding reference positions of a first set of the partial measurement data of the plurality of partial measurement data;
    copy data from a sequence of the partial measurement data to an index corresponding to a measurement location of a cross sectional data sequence for combining into one cross sectional data;
    combine each of the sets of the plurality of partial measurement data into one data set using the set reference position and taking account of differences between the set reference position of the first set of partial measurement data and reference positions of other sets of partial measurement data so that the one data set is defined with respect to the set reference position; and
    calculate a geometric tolerance of the shape of the surface of the measured object using the one cross sectional data, configured by circumferential data based on the combined data set, to obtain the geometric tolerance of a cross section of the measured object at one time.

11. The method according to claim 1, wherein the stylus is displaced over a biasing force of a spring and a displacement amount of the stylus is detected by a displacement detector comprising a differential transformer within a detection head.

12. The method according to claim 11, wherein the stylus is attached to the detection head.

13. The shape detection device according to claim 2, wherein the stylus is displaced over a biasing force of a spring and a displacement amount of the stylus is detected by a displacement detector comprising a differential transformer within a detection head.

14. The shape detection device according to claim 13, wherein the stylus is attached to the detection head.

15. The circularity measuring system according to claim 10, wherein the stylus is displaced over a biasing force of a spring and a displacement amount of the stylus is detected by a displacement detector comprising a differential transformer within a detection head.

16. The circularity measuring system according to claim 15,
  wherein the stylus is attached to the detection head.

* * * * *